(12) United States Patent
Kenney (10) Patent No.: US 8,768,991 B2
(45) Date of Patent: Jul. 1, 2014

(54) MECHANISM TO FIND FIRST TWO VALUES

(75) Inventor: Robert D. Kenney, Austin, TX (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 13/157,515

(22) Filed: Jun. 10, 2011

(65) Prior Publication Data

US 2012/0143874 A1   Jun. 7, 2012

Related U.S. Application Data

(60) Provisional application No. 61/418,999, filed on Dec. 2, 2010.

(51) Int. Cl.
*G06F 7/00* (2006.01)

(52) U.S. Cl.
USPC .............................. 708/212; 708/200; 707/745

(58) Field of Classification Search
None
See application file for complete search history.

(56) References Cited

U.S. PATENT DOCUMENTS

| 5,490,280 A | 2/1996 | Gupta et al. |
| 5,560,025 A | 9/1996 | Gupta et al. |
| 6,513,053 B1 | 1/2003 | Hill |

*Primary Examiner* — Michael D Yaary
(74) *Attorney, Agent, or Firm* — Stephen J. Curran; Meyertons, Hood, Kivlin, Kowert & Goetzel, P.C.

(57) ABSTRACT

An integrated circuit includes a search unit configured to access an input vector including a number of bits, and to find a first and a second instance of a predetermined bit value such as a logic zero or a logic one, for example. The search unit may be further configured to generate an output that includes an indication of a bit position of the first instance of the predetermined bit value within the input vector, and an indication of a bit position of the second instance of the predetermined bit value within the input vector.

22 Claims, 4 Drawing Sheets

MECHANISM TO FIND FIRST TWO VALUES

This patent application claims priority to Provisional Patent Application Ser. No. 61/418,999, filed Dec. 2, 2010, the content of which is herein incorporated by reference in its entirety.

BACKGROUND

1. Technical Field

This disclosure relates to search logic, and more particularly to logic for finding the first two instances of a particular value in an array.

2. Description of the Related Art

Many processor designs include a register file or register bank that the CPU uses during instruction execution. In an out of order execution engine, the individual registers may be used and retired out of order. Accordingly, a mechanism may keep track of which registers are available. However, some conventional mechanisms may use many logic gates and may have significant delays in finding the free registers.

SUMMARY OF THE EMBODIMENTS

Various embodiments of a mechanism to find the first two values of are disclosed. Broadly speaking, a mechanism for finding the first two instances of a particular value within a number of values is contemplated. In one embodiment, an integrated circuit includes a search unit configured to access an input vector including a number of bits, and to find a first and a second instance of a predetermined bit value such as a logic zero or a logic one, for example. The search unit may be further configured to generate a first output vector that includes an indication of a bit position of the first instance of the predetermined bit value within the input vector, and to generate a second output vector that includes an indication of a bit position of the second instance of the predetermined bit value within the input vector.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 1:
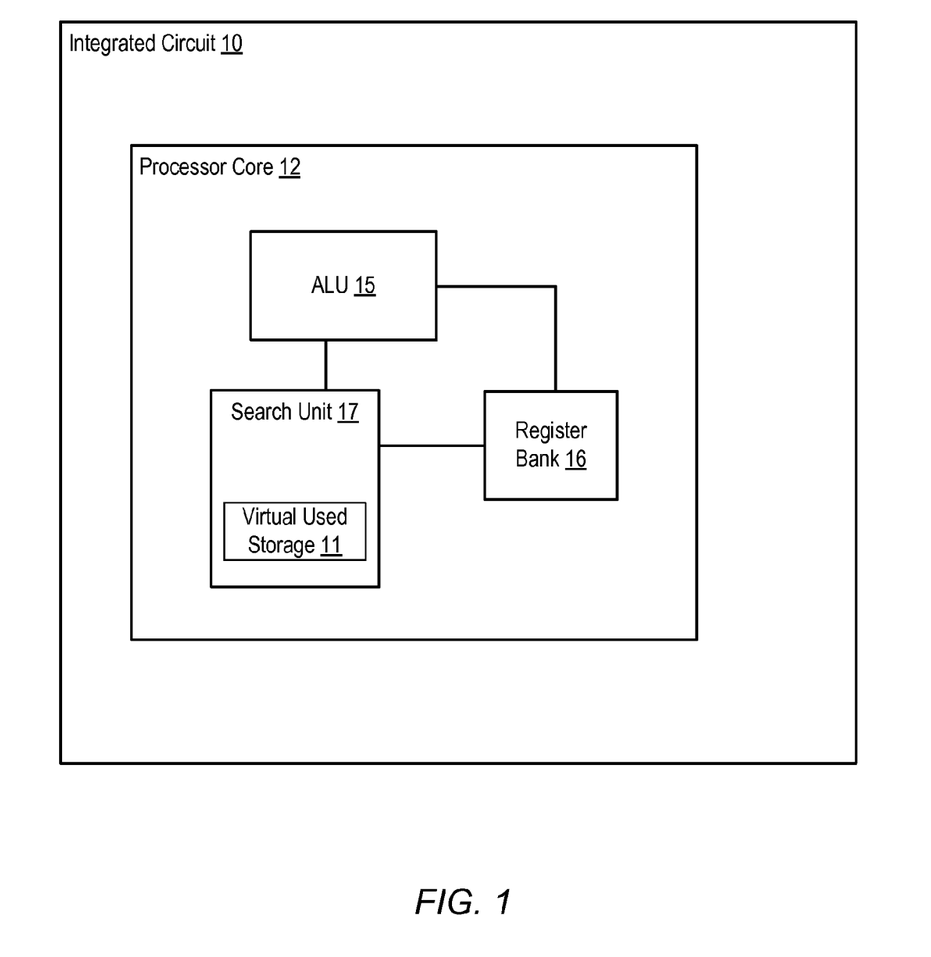
FIG. 1 is a block diagram of one embodiment of an integrated circuit including a search unit.

Turning now to FIG. 1, a block diagram of one embodiment of an integrated circuit including a search unit is shown. The integrated circuit 10 includes a processor core 12 that includes an arithmetic and logic unit (ALU) 15 that is coupled to a register bank 16 and to a search unit 17. In one embodiment, the integrated circuit 10 may be considered as a system on a chip (SOC).

In various embodiments, the processor core 12 may execute instructions corresponding to application software as well as operating system (OS) software. During execution, the register bank 16 may be accessed whenever the ALU 15 needs to allocate or use a new register. Accordingly, the search unit 17 may be configured to identify the first two registers that are free in the register bank 16. In one embodiment, the search unit 17 may maintain a vector or array (e.g., virtual used storage 11) that includes a number of bit positions (not shown in FIG. 1). In one embodiment, the virtual used storage 11 may be implemented as an array, vector, buffer, or list. For example, the storage may be a number of sequential clocked storage elements such as flip-flops. Alternatively, the storage may be a memory type storage including a number of storage locations. In either case, each bit position may represent one of the registers in register bank 16. In one implementation, if a register is available for use, the bit that corresponds to that register may indicate the availability by having a logic value of zero, for example. Thus, the search unit 17 may be configured to find and identify the first two logic zeros in the vector. In other embodiments, the vector may be maintained within the register bank 16 or other logic, and the indication of an available register may be a logic value of one. In such embodiments, the search unit 17 may access the vector wherever it may reside.

Figure 2:
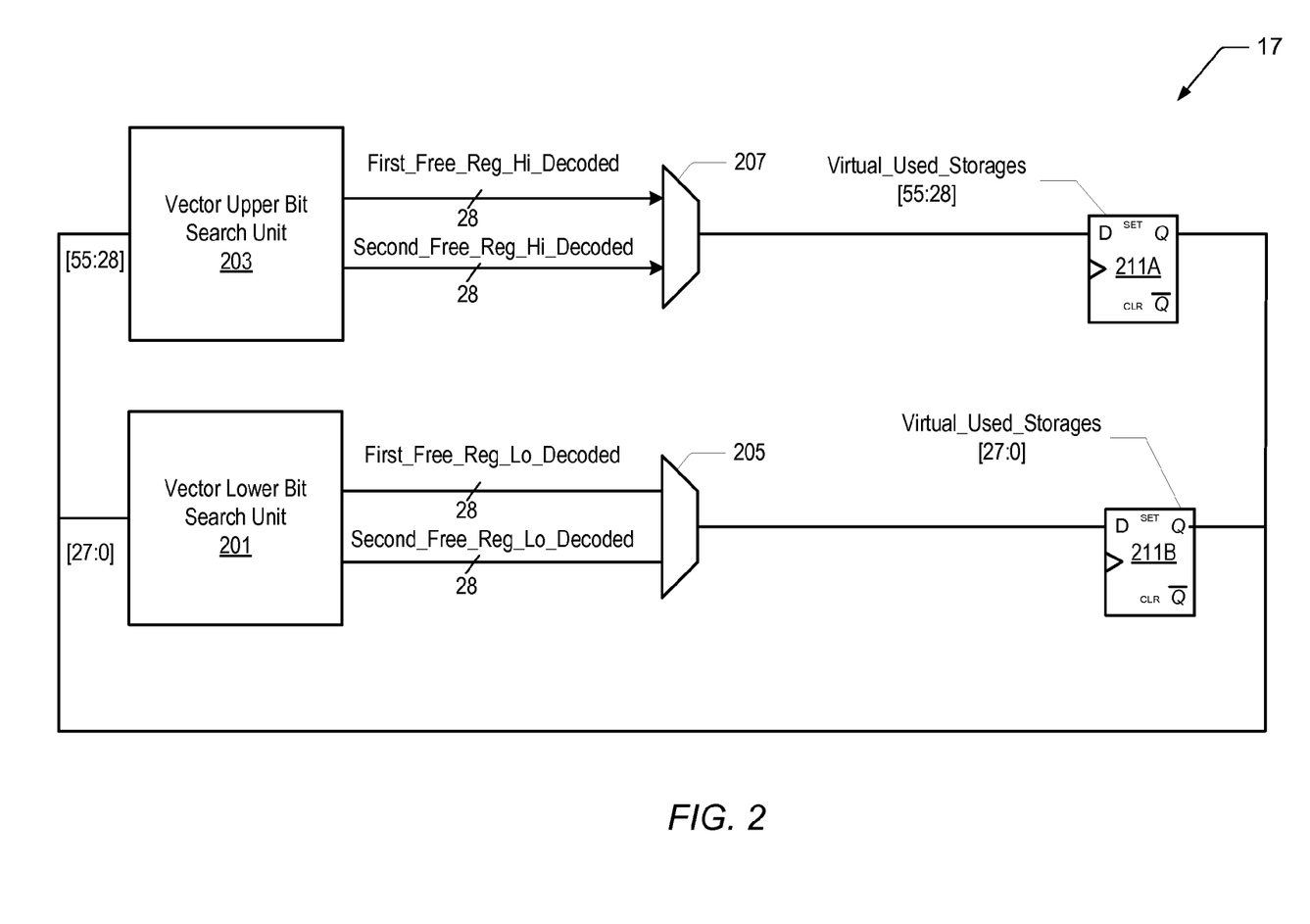
FIG. 2 is a conceptual block diagram of one embodiment of a search unit.

Referring to FIG. 2, a block diagram of another embodiment of the search unit of FIG. 1 is shown. The search unit 17 includes a vector upper bit search unit 203 and a vector lower bit search unit 201. The vector lower bit search unit 201 generates the first_free_reg_lo_decoded vector and the second_free_reg_lo_decoded vector, and provides them to the inputs of a mux 205. The output of the mux 205 is coupled to the data input of a flip-flop 211B, which is representative of one bit of the virtual used storages. The vector upper bit search unit 203 generates the first_free_reg_hi_decoded vector and the second_free_reg_hi_decoded vector, and provides them to the inputs of a mux 207. The output of the mux 207 is coupled to the data input of a flip-flop 211A, which is representative of one bit of the virtual used storages. The vector upper bit search unit 203 is coupled to receive bits [55:28] from the virt_used_storages 211A, while the vector lower bit search unit 201 is coupled to receive bits [27:0] from the virt_used_storages 211B.

It is noted that the diagram of FIG. 2 is a conceptual block diagram that is meant to depict the general operation of search unit 17 operating on a vector or array. More particularly, the search unit 17 may find the first two values that are indicative of free register slots in a given vector of valid bits (e.g., virt_used_storages). In the illustrated embodiment, the vector is 56 bits, but may be operated on using two 28-bit vectors; an upper 28 bits and a lower 28 bits. Some conventional units may use multiple levels of AND-gates to serially find the first two values. For example, given a 28-bit vector that includes the following bits: 1111_1101_1111_1110_1111_1001_0010, a conventional search unit may produce the following two vectors: first_free_reg[27:0] 0000_0010_0000_0000_0000_0000_0000, and second_free_reg[27:0] 0000_0000_0000_0001_0000_0000_0000. These two vectors may then be used to assign new virtual registers to the incoming instructions. The conventional search unit essentially performs two serial word-wide traversals to obtain the two vectors. The long path in the conventional implementation scales linearly with vector length.

However, the search units 201 and 203 operate concurrently on groups of bits (e.g., triplets) as described further below. More particularly, algorithmically a pre-first and a pre-second vector are formed. These vectors point out or identify the first and second free bits in each triplet, respectively, on a triplet by triplet basis. Then three levels of combinatorial logic are used to search each triplet. It is noted that although the embodiments described use groupings of bits into triplets, it is contemplated that other groupings of bits may be used. For example, bit pairs, quadruplets, etc, may be used.

Each of the search units 201 and 203 operate similar to a modified carry-lookahead adder tree in which the carry propagates are looked at ahead of time and in parallel to determine what the outcomes will be. This is in contrast to a ripple adder which calculates the outcome serially. In the search units 201 and 203, only one word-wide traversal is performed to obtain the first free and second free vectors. This type of operation is shown below in the example code segment, and in the conceptual block diagram of FIG. 3, which illustrates more detailed aspects of the embodiment of the search unit of FIG. 2.

Figure 3:
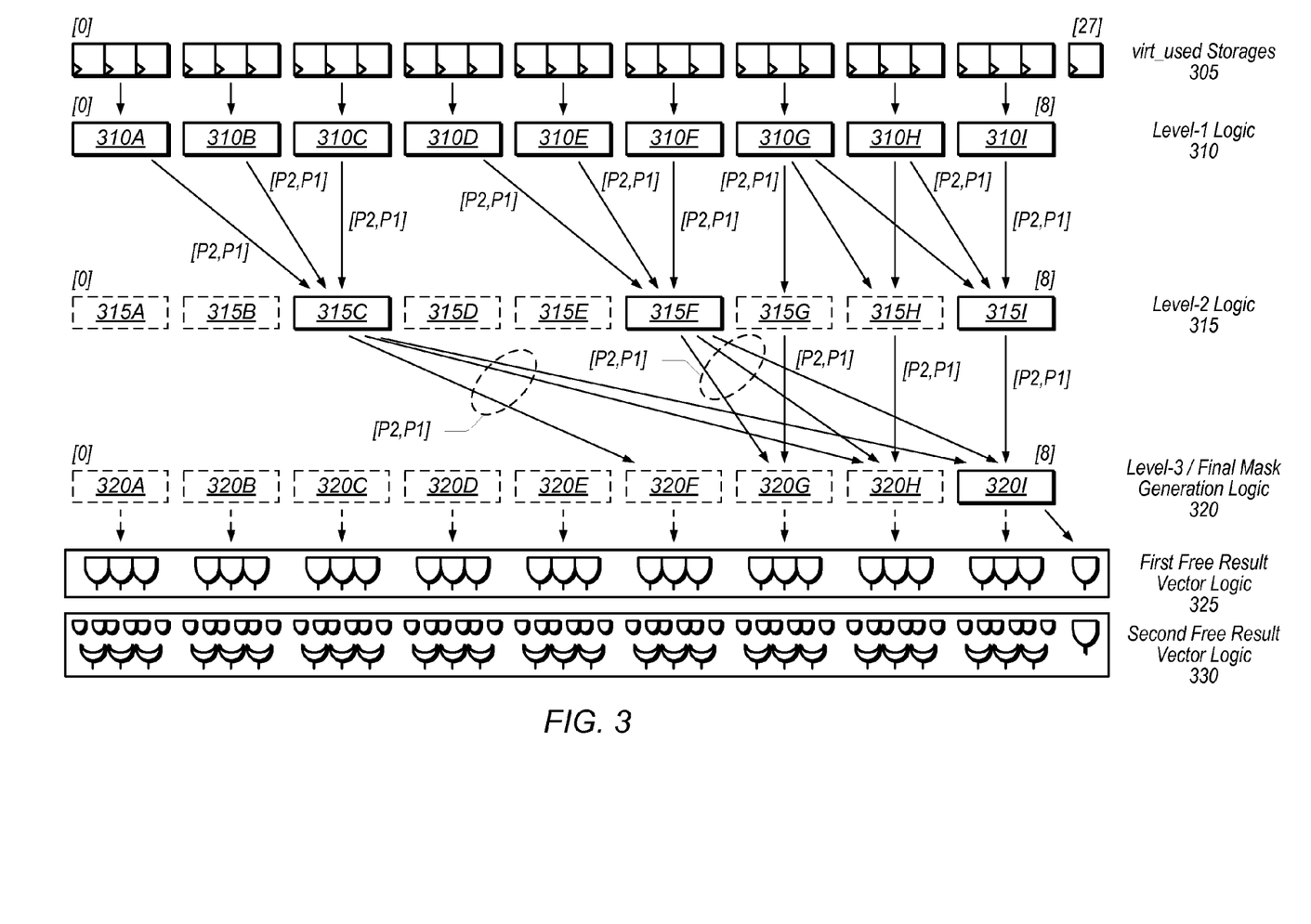
FIG. 3 is a conceptual block diagram illustrating more detailed aspects of an embodiment of the search unit of FIG. 2.

Referring to FIG. 3, a conceptual block diagram of one embodiment of the search unit of FIG. 2 is shown. The diagram of FIG. 3 shows how the critical path converges on the last triplet at level 3. Each of the blocks (e.g., 310, 315, 320) at levels 1, 2, and 3 represent combinatorial logic used to generate propagate signals. More particularly, in parallel, propagate-1 (prop1) and propagate-2 (prop2) signals are generated on each triplet in the level 1 logic 310. For example, block 310I generates propagate signals based on bits [26:24] received from the from the virtual used storages 305, block 310H generates propagate signals based on bits [23:21] received from the from the virtual used storage 305, and so on.

In the level-2 logic 315, triplets of adjacent level-1, prop1, and prop2 signals are combined. For example, block 315I in the level 2 logic generates propagate signals based on the prop1 and prop2 signals received from the triplets 6, 7, and 8 in the level one logic 310. Similarly, block 315H generates propagate signals based on the prop1 and prop2 signals received from the triplets 6 and 7 in the level one logic 310, while block 315G generates propagate signals based on the prop1 and prop2 signals received from the triplet 6 in the level one logic 310, and so on.

In the level-3 logic 320, triplets of adjacent level-2, prop1, and prop2 signals are combined, and so forth. For example, block 320I generates propagate signals based on the prop1 and prop2 signals received from the triplets 2, 5, and 8 in the level one logic 315. Similarly, block 320H generates propagate signals based on the prop1 and prop2 signals received from the triplets 2, 5, and 7 in the level one logic 315, while block 320G generates propagate signals based on the prop1 and prop2 signals received from the triplets 2, 5, and 6 in the level one logic 315, and so on.

The prop2 signal means that no free values (e.g., "0"s) have been seen yet (i.e., two first free slots are available). The prop1 signal means that one free value (e.g., "0") has been seen. Therefore, two free values are not possible at this point. The H signal (halt in the example below) means that two free slots have already been acknowledged and, therefore, no free slots can be assigned.

In addition, the first free result vector logic 325 performs the final AND-ing operations between the level three results and the pre-first vector to form the first free result vector and is performed substantially in parallel with AND-OR operations between the level three results and the pre-first vector and the pre-second vector to form the second free result vector in the second free result vector logic 330. The pre-first and pre-second vector generating logic is not shown for brevity in FIG. 2. However, as described further below, this logic creates the pre-first and pre-second vectors in parallel and concurrently with the level-1 logic from the triplets in the input vector.

It is noted that the diagrams depicted in FIG. 2 and FIG. 3 are conceptual diagrams used for discussion purposes and thus do not include many logic gates. However, the following segment of code which is written in a hardware definition language (HDL) such as Verilog, for example, when executed by a processing system executing specific logic synthesis application software can be synthesized into a circuit block to perform the operations described above. Specifically, a search unit that is created using the following code may be configured to find the first two zero values in a vector having 28 bits. However, it is noted that the code segment could be modified to operate on a vector having any number of bits.

```
//---------------------------------------------------------------------------
// Abstract : Find First Two 0's
//---------------------------------------------------------------------------
//
// Overview
// --------
//
// This logic replaces the large AND-ing structure used to find the first and second
// free registers in the virt_used_q array hi and lo arrays. A carry-propagate
// tree structure is employed reducing the need for two word-wide propagations
// to only one word-wide traversal.
//
//---------------------------------------------------------------------------
module find_first_two_0s (
                                virt_used_i,
                                first_free_reg_decoded_o,
                                second_free_reg_decoded_o,
                                valid_first_free_o,
                                valid_second_free_o
                                );
    input  [27:0] virt_used_i;
    output [27:0] first_free_reg_decoded_o;
    output [27:0] second_free_reg_decoded_o;
    output        valid_first_free_o;
    output        valid_second_free_o;
    wire   [27:0]         pre_1st;
    wire   [27:0]         pre_2nd;
    // pre_1st is the what the first 0 will be within the triplet under inspection.
    // pre_2nd is the what the second 0 will be within the triplet under inspection.
    //
    // virt_used_q  pre_1st pre_2nd
    // [0 1 2]      [0 1 2] [0 1 2]
    // -----------------------------
    //   000         100     010
    //   001         100     010
    //   010         100     001
    //   011         100     000
    //   100         010     001
    //   101         010     000
    //   110         001     000
    //   111         000     000
    assign pre_1st[24] = ~virt_used_i[24];
    assign pre_1st[25] = virt_used_i[24] & ~virt_used_i[25];
    assign pre_1st[26] = virt_used_i[24] & virt_used_i[25] & ~virt_used_i[26];
    assign pre_1st[21] = ~virt_used_i[21];
    assign pre_1st[22] = virt_used_i[21] & ~virt_used_i[22];
    assign pre_1st[23] = virt_used_i[21] & virt_used_i[22] & ~virt_used_i[23];
    assign pre_1st[18] = ~virt_used_i[18];
    assign pre_1st[19] = virt_used_i[18] & ~virt_used_i[19];
    assign pre_1st[20] = virt_used_i[18] & virt_used_i[19] & ~virt_used_i[20];
    assign pre_1st[15] = ~virt_used_i[15];
    assign pre_1st[16] = virt_used_i[15] & ~virt_used_i[16];
    assign pre_1st[17] = virt_used_i[15] & virt_used_i[16] & ~virt_used_i[17];
    assign pre_1st[12] = ~virt_used_i[12];
    assign pre_1st[13] = virt_used_i[12] & ~virt_used_i[13];
    assign pre_1st[14] = virt_used_i[12] & virt_used_i[13] & ~virt_used_i[14];
    assign pre_1st[ 9] = ~virt_used_i[ 9];
    assign pre_1st[10] = virt_used_i[ 9] & ~virt_used_i[10];
    assign pre_1st[11] = virt_used_i[ 9] & virt_used_i[10] & ~virt_used_i[11];
    assign pre_1st[ 6] = ~virt_used_i[ 6];
    assign pre_1st[ 7] = virt_used_i[ 6] & ~virt_used_i[ 7];
    assign pre_1st[ 8] = virt_used_i[ 6] & virt_used_i[ 7] & ~virt_used_i[ 8];
    assign pre_1st[ 3] = ~virt_used_i[ 3];
    assign pre_1st[ 4] = virt_used_i[ 3] & ~virt_used_i[ 4];
    assign pre_1st[ 5] = virt_used_i[ 3] & virt_used_i[ 4] & ~virt_used_i[ 5];
    assign pre_1st[ 0] = ~virt_used_i[ 0];
    assign pre_1st[ 1] = virt_used_i[ 0] & ~virt_used_i[ 1];
    assign pre_1st[ 2] = virt_used_i[ 0] & virt_used_i[ 1] & ~virt_used_i[ 2];
    assign pre_2nd[24] = 1'b0;
    assign pre_2nd[25] = ~virt_used_i[24] & ~virt_used_i[25];
    assign pre_2nd[26] = (virt_used_i[24] ^ virt_used_i[25]) & ~virt_used_i[26];
    assign pre_2nd[21] = 1'b0;
    assign pre_2nd[22] = ~virt_used_i[21] & ~virt_used_i[22];
    assign pre_2nd[23] = (virt_used_i[21] ^ virt_used_i[22]) & ~virt_used_i[23];
    assign pre_2nd[18] = 1'b0;
    assign pre_2nd[19] = ~virt_used_i[18] & ~virt_used_i[19];
    assign pre_2nd[20] = (virt_used_i[18] ^ virt_used_i[19]) & ~virt_used_i[20];
    assign pre_2nd[15] = 1'b0;
    assign pre_2nd[16] = ~virt_used_i[15] & ~virt_used_i[16];
    assign pre_2nd[17] = (virt_used_i[15] ^ virt_used_i[16]) & ~virt_used_i[17];
    assign pre_2nd[12] = 1'b0;
```

-continued

```
assign pre_2nd[13] = ~virt_used_i[12] & ~virt_used_i[13];
assign pre_2nd[14] = (virt_used_i[12] ^ virt_used_i[13]) & ~virt_used_i[14];
assign pre_2nd[ 9] = 1'b0;
assign pre_2nd[10] = ~virt_used_i[ 9] & ~virt_used_i[10];
assign pre_2nd[11] = (virt_used_i[ 9] ^ virt_used_i[10]) & ~virt_used_i[11];
assign pre_2nd[ 6] = 1'b0;
assign pre_2nd[ 7] = ~virt_used_i[ 6] & ~virt_used_i[ 7];
assign pre_2nd[ 8] = (virt_used_i[ 6] ^ virt_used_i[ 7]) & ~virt_used_i[ 8];
assign pre_2nd[ 3] = 1'b0;
assign pre_2nd[ 4] = ~virt_used_i[ 3] & ~virt_used_i[ 4];
assign pre_2nd[ 5] = (virt_used_i[ 3] ^ virt_used_i[ 4]) & ~virt_used_i[ 5];
assign pre_2nd[ 0] = 1'b0;
assign pre_2nd[ 1] = ~virt_used_i[ 0] & ~virt_used_i[ 1];
assign pre_2nd[ 2] = (virt_used_i[ 0] ^ virt_used_i[ 1]) & ~virt_used_i[ 2];
// Level 1 propagation
wire [8:0]      p2_lvl1; // propagate 2 (0 0's seen so far)
wire [8:0]      p1_lvl1; // propagate 1 (1 0's seen so far)
assign  p2_lvl1[8] = virt_used_i[26] & virt_used_i[25] & virt_used_i[24];
assign  p1_lvl1[8] = (~virt_used_i[26] & virt_used_i[25] & virt_used_i[24]) |
                    ( virt_used_i[26] & ~virt_used_i[25] & virt_used_i[24]) |
                    ( virt_used_i[26] & virt_used_i[25] & ~virt_used_i[24]);
assign  p2_lvl1[7] = virt_used_i[23] & virt_used_i[22] & virt_used_i[21];
assign  p1_lvl1[7] = (~virt_used_i[23] & virt_used_i[22] & virt_used_i[21]) |
                    ( virt_used_i[23] & ~virt_used_i[22] & virt_used_i[21]) |
                    ( virt_used_i[23] & virt_used_i[22] & ~virt_used_i[21]);
assign  p2_lvl1[6] = virt_used_i[20] & virt_used_i[19] & virt_used_i[18];
assign  p1_lvl1[6] = (~virt_used_i[20] & virt_used_i[19] & virt_used_i[18]) |
                    ( virt_used_i[20] & ~virt_used_i[19] & virt_used_i[18]) |
                    ( virt_used_i[20] & virt_used_i[19] & ~virt_used_i[18]);
assign  p2_lvl1[5] = virt_used_i[17] & virt_used_i[16] & virt_used_i[15];
assign  p1_lvl1[5] = (~virt_used_i[17] & virt_used_i[16] & virt_used_i[15]) |
                    ( virt_used_i[17] & ~virt_used_i[16] & virt_used_i[15]) |
                    ( virt_used_i[17] & virt_used_i[16] & ~virt_used_i[15]);
assign  p2_lvl1[4] = virt_used_i[14] & virt_used_i[13] & virt_used_i[12];
assign  p1_lvl1[4] = (~virt_used_i[14] & virt_used_i[13] & virt_used_i[12]) |
                    ( virt_used_i[14] & ~virt_used_i[13] & virt_used_i[12]) |
                    ( virt_used_i[14] & virt_used_i[13] & ~virt_used_i[12]);
assign  p2_lvl1[3] = virt_used_i[11] & virt_used_i[10] & virt_used_i[ 9];
assign  p1_lvl1[3] = (~virt_used_i[11] & virt_used_i[10] & virt_used_i[ 9]) |
                    ( virt_used_i[11] & ~virt_used_i[10] & virt_used_i[ 9]) |
                    ( virt_used_i[11] & virt_used_i[10] & ~virt_used_i[ 9]);
assign  p2_lvl1[2] = virt_used_i[ 8] & virt_used_i[ 7] & virt_used_i[ 6];
assign  p1_lvl1[2] = (~virt_used_i[ 8] & virt_used_i[ 7] & virt_used_i[ 6]) |
                    ( virt_used_i[ 8] & ~virt_used_i[ 7] & virt_used_i[ 6]) |
                    ( virt_used_i[ 8] & virt_used_i[ 7] & ~virt_used_i[ 6]);
assign  p2_lvl1[1] = virt_used_i[ 5] & virt_used_i[ 4] & virt_used_i[ 3];
assign  p1_lvl1[1] = (~virt_used_i[ 5] & virt_used_i[ 4] & virt_used_i[ 3]) |
                    ( virt_used_i[ 5] & ~virt_used_i[ 4] & virt_used_i[ 3]) |
                    ( virt_used_i[ 5] & virt_used_i[ 4] & ~virt_used_i[ 3]);
assign  p2_lvl1[0] = virt_used_i[ 2] & virt_used_i[ 1] & virt_used_i[ 0];
assign  p1_lvl1[0] = (~virt_used_i[ 2] & virt_used_i[ 1] & virt_used_i[ 0]) |
                    ( virt_used_i[ 2] & ~virt_used_i[ 1] & virt_used_i[ 0]) |
                    ( virt_used_i[ 2] & virt_used_i[ 1] & ~virt_used_i[ 0]);
// Level 2 propagation
wire [8:0]      p2_lvl2;
wire [8:0]      p1_lvl2;
assign  p2_lvl2[8] = p2_lvl1[6] & p2_lvl1[7] & p2_lvl1[8];
assign  p1_lvl2[8] = (p2_lvl1[6] & p2_lvl1[7] & p1_lvl1[8]) |
                    (p2_lvl1[6] & p1_lvl1[7] & p2_lvl1[8]) |
                    (p1_lvl1[6] & p2_lvl1[7] & p2_lvl1[8]);
assign  p2_lvl2[7] = p2_lvl1[6] & p2_lvl1[7];
assign  p1_lvl2[7] = (p2_lvl1[6] & p1_lvl1[7]) |
                    (p1_lvl1[6] & p2_lvl1[7]);
assign  p2_lvl2[6] = p2_lvl1[6];
assign  p1_lvl2[6] = p1_lvl1[6];
assign  p2_lvl2[5] = p2_lvl1[3] & p2_lvl1[4] & p2_lvl1[5];
assign  p1_lvl2[5] = (p2_lvl1[3] & p2_lvl1[4] & p1_lvl1[5]) |
                    (p2_lvl1[3] & p1_lvl1[4] & p2_lvl1[5]) |
                    (p1_lvl1[3] & p2_lvl1[4] & p2_lvl1[5]);
assign  p2_lvl2[4] = p2_lvl1[3] & p2_lvl1[4];
assign  p1_lvl2[4] = (p2_lvl1[3] & p1_lvl1[4]) |
                    (p1_lvl1[3] & p2_lvl1[4]);
assign  p2_lvl2[3] = p2_lvl1[3];
assign  p1_lvl2[3] = p1_lvl1[3];
assign  p2_lvl2[2] = p2_lvl1[0] & p2_lvl1[1] & p2_lvl1[2];
assign  p1_lvl2[2] = (p2_lvl1[0] & p2_lvl1[1] & p1_lvl1[2]) |
                    (p2_lvl1[0] & p1_lvl1[1] & p2_lvl1[2]) |
                    (p1_lvl1[0] & p2_lvl1[1] & p2_lvl1[2]);
```

```
    assign  p2_lvl2[1] = p2_lvl1[0] & p2_lvl1[1];
    assign  p1_lvl2[1] = (p2_lvl1[0] & p1_lvl1[1]) |
                        (p1_lvl1[0] & p2_lvl1[1]);
    assign  p2_lvl2[0] = p2_lvl1[0];
    assign  p1_lvl2[0] = p1_lvl1[0];
    // Level 3 propagation
    wire [8:0]      p2_lvl3;
    wire [8:0]      p1_lvl3;
    assign  p2_lvl3[8] = p2_lvl2[2] & p2_lvl2[5] & p2_lvl2[8];
    assign  p1_lvl3[8] = (p2_lvl2[2] & p2_lvl2[5] & p1_lvl2[8]) |
                        (p2_lvl2[2] & p1_lvl2[5] & p2_lvl2[8]) |
                        (p1_lvl2[2] & p2_lvl2[5] & p2_lvl2[8]);
    assign  p2_lvl3[7] = p2_lvl2[2] & p2_lvl2[5] & p2_lvl2[7];
    assign  p1_lvl3[7] = (p2_lvl2[2] & p2_lvl2[5] & p1_lvl2[7]) |
                        (p2_lvl2[2] & p1_lvl2[5] & p2_lvl2[7]) |
                        (p1_lvl2[2] & p2_lvl2[5] & p2_lvl2[7]);
    assign  p2_lvl3[6] = p2_lvl2[2] & p2_lvl2[5] & p2_lvl2[6];
    assign  p1_lvl3[6] = (p2_lvl2[2] & p2_lvl2[5] & p1_lvl2[6]) |
                        (p2_lvl2[2] & p1_lvl2[5] & p2_lvl2[6]) |
                        (p1_lvl2[2] & p2_lvl2[5] & p2_lvl2[6]);
    assign  p2_lvl3[5] = p2_lvl2[2] & p2_lvl2[5];
    assign  p1_lvl3[5] = (p2_lvl2[2] & p1_lvl2[5]) |
                        (p1_lvl2[2] & p2_lvl2[5]);
    assign  p2_lvl3[4] = p2_lvl2[2] & p2_lvl2[4];
    assign  p1_lvl3[4] = (p2_lvl2[2] & p1_lvl2[4]) |
                        (p1_lvl2[2] & p2_lvl2[4]);
    assign  p2_lvl3[3] = p2_lvl2[2] & p2_lvl2[3];
    assign  p1_lvl3[3] = (p2_lvl2[2] & p1_lvl2[3]) |
                        (p1_lvl2[2] & p2_lvl2[3]);
    assign  p2_lvl3[2] = p2_lvl2[2];
    assign  p1_lvl3[2] = p1_lvl2[2];
    assign  p2_lvl3[1] = p2_lvl2[1];
    assign  p1_lvl3[1] = p1_lvl2[1];
    assign  p2_lvl3[0] = p2_lvl2[0];
    assign  p1_lvl3[0] = p1_lvl2[0];
    // final vector production
    assign  first_free_reg_decoded_o[27] = p2_lvl3[8] & ~virt_used_i[27];
    assign  first_free_reg_decoded_o[26:24] = {3{p2_lvl3[7]}} & pre_1st[26:24];
    assign  first_free_reg_decoded_o[23:21] = {3{p2_lvl3[6]}} & pre_1st[23:21];
    assign  first_free_reg_decoded_o[20:18] = {3{p2_lvl3[5]}} & pre_1st[20:18];
    assign  first_free_reg_decoded_o[17:15] = {3{p2_lvl3[4]}} & pre_1st[17:15];
    assign  first_free_reg_decoded_o[14:12] = {3{p2_lvl3[3]}} & pre_1st[14:12];
    assign  first_free_reg_decoded_o[11: 9] = {3{p2_lvl3[2]}} & pre_1st[11: 9];
    assign  first_free_reg_decoded_o[ 8: 6] = {3{p2_lvl3[1]}} & pre_1st[ 8: 6];
    assign  first_free_reg_decoded_o[ 5: 3] = {3{p2_lvl3[0]}} & pre_1st[ 5: 3];
    assign  first_free_reg_decoded_o[ 2: 0] =                   pre_1st[ 2: 0];
    // at least one is valid as long as ~p2 seen at end of word or final is one
    assign  valid_first_free_o = ~p2_lvl3[8] | ~virt_used_i[27];
    assign  second_free_reg_decoded_o[27] = p1_lvl3[8] & ~virt_used_i[27];
    assign  second_free_reg_decoded_o[26:24] = ({3{p2_lvl3[7]}} & pre_2nd[26:24]) |
({3{p1_lvl3[7]}} & pre_1st[26:24]);
    assign  second_free_reg_decoded_o[23:21] = ({3{p2_lvl3[6]}} & pre_2nd[23:21]) |
({3{p1_lvl3[6]}} & pre_1st[23:21]);
    assign  second_free_reg_decoded_o[20:18] = ({3{p2_lvl3[5]}} & pre_2nd[20:18]) |
({3{p1_lvl3[5]}} & pre_1st[20:18]);
    assign  second_free_reg_decoded_o[17:15] = ({3{p2_lvl3[4]}} & pre_2nd[17:15]) |
({3{p1_lvl3[4]}} & pre_1st[17:15]);
    assign  second_free_reg_decoded_o[14:12] = ({3{p2_lvl3[3]}} & pre_2nd[14:12]) |
({3{p1_lvl3[3]}} & pre_1st[14:12]);
    assign  second_free_reg_decoded_o[11: 9] = ({3{p2_lvl3[2]}} & pre_2nd[11: 9]) |
({3{p1_lvl3[2]}} & pre_1st[11: 9]);
    assign  second_free_reg_decoded_o[ 8: 6] = ({3{p2_lvl3[1]}} & pre_2nd[ 8: 6]) |
({3{p1_lvl3[1]}} & pre_1st[ 8: 6]);
    assign  second_free_reg_decoded_o[ 5: 3] = ({3{p2_lvl3[0]}} & pre_2nd[ 5: 3]) |
({3{p1_lvl3[0]}} & pre_1st[ 5: 3]);
    assign  second_free_reg_decoded_o[ 2: 0] = (            pre_2nd[ 2: 0]);
    // at least two are valid as long as ~p2 nor ~p1 seen at end of word or final is one
    assign  valid_second_free_o = (~p2_lvl3[8] & ~p1_lvl3[8]) | (p1_lvl3[8] &
~virt_used_i[27]);
endmodule // find_first_two_0s
```

As shown above, each succeeding logic level uses a logical combination of bits from the preceding level. It is noted that the embodiment shown and described in conjunction with FIG. 2 and FIG. 3, and the above HDL code, scales logarithmically with vector length.

To illustrate how the search units 201 and 203 operate on a vector, an example input vector and subsequent results are given below. In the following example, search units (e.g., 201 and 203) operate on the 28-bit input vector in triplets. In the example below, bit [0] of the input vector is on the far left. Similarly, triplet [0] is on the far left.

| 111 | 111 | 111 | 101 | 111 | 111 | 101 | 010 | 111 | 1 | Input Vector |
|-----|-----|-----|-----|-----|-----|-----|-----|-----|---|--------------|
| 000 | 000 | 000 | 010 | 000 | 000 | 010 | 100 | 000 | 0 | Pre-First Vector |
| 000 | 000 | 000 | 000 | 000 | 000 | 000 | 001 | 000 | 0 | Pre-Second Vector |
| P2  | P2  | P2  | P1  | P2  | P2  | P1  | H   | P2  |   | Level-1 |
| P2  | P2  | P2  | P1  | P1  | P1  | P1  | H   | H   |   | Level-2 |
| P2  | P2  | P2  | P1  | P1  | P1  | H   | H   | H   |   | Level-3/Final Mask Generation |
| 000 | 000 | 000 | 010 | 000 | 000 | 010 | 100 | 000 | 0 | Pre-First Vector (above) |
| 000 | 000 | 000 | 000 | 000 | 000 | 000 | 001 | 000 | 0 | Pre-Second Vector (above) |
| 000 | 000 | 000 | 010 | 000 | 000 | 000 | 000 | 000 | 0 | First-Free Vector |
| 000 | 000 | 000 | 000 | 000 | 000 | 010 | 000 | 000 | 0 | Second-Free Vector |

Where:
P2: Propagate 2 (no "0" seen yet)
P1: Propagate 1 (at least one "0" seen so far)
H: Halt (two "0"s seen so far)

Referring collectively to the above example, the RTL code segment above, and to the logic diagram shown in FIG. 3, the pre-first vector and the pre-second vector are all zero since there are no zeros in triplets [2:0] of the input vector. In triplet [3] the second bit is a zero. Thus, the second bit of the pre-first vector is a one. Similarly for triplet [6] in the input vector. However, in triplet [7], both the first and third bits are zero. Thus, the first bit of the pre-first vector, and the third bit of the pre-second vector are both one. Accordingly, the pre-first vector indicates the first free bit in each triplet and the pre-second vector indicates the second free bit in each triplet. The pre-first and pre-second vectors are used in the final vector generating, as described below.

Each of the levels 1, 2, and 3 generates 9 [8:0] triplet propagate values. More particularly, as shown in the RTL code segment, in the level 1 logic for example, the triplet [8] propagate signal is generated from bits 26, 25, and 24 of the input vector. Bit 27 is not included in the level 1, 2, and 3 logic because bit 27 is used directly in the generation of the final vectors to determine if it is the first free slot. The triplet [7] propagate signal is generated from bits 23, 22, and 21 of the input vector. The triplet [6] propagate signal is generated from bits 20, 19, and 18 of the input vector, and so on. To generate a prop2 signal, the level 1 logic performs a logical AND of the three bits for each triplet, while a prop1 signal is generated by performing logical AND/OR combinations as shown in the RTL code segment above. For example, in the level 1 logic for triplet [8], a P2 is generated if the result of AND-ing bits 26, 25, and 24 of the input vector is true. If neither the P2 nor the P1 statements are true, then the propagate signal is represented as an H in the above example.

In the level 2 logic, the propagate signals are generated from the level 1 results. More particularly, as shown in the above RTL code segment the triplet [8] propagate signal is generated from triplets [8:6] of level 1, the triplet [7] propagate signal is generated from the triplets [7:6] of level 1, and the triplet [6] propagate signal is generated from the triplet [6] of level 1. If neither the P2 nor the P1 statements are true, then the propagate signal is represented as an H in the above example.

In the level 3 logic, the propagate signals are generated from the level 2 results. For example, the triplet [8] propagate signal is generated by performing logical AND operations using triplets [2], [5], and [8]. Similarly, the triplet [7] propagate signal is generated by performing logical AND operations using triplets [2], [5], and [7], while the triplet [6] propagate signal is generated by performing logical AND operations using triplets [2], [5], and [6].

Once the propagate signals have been generated through all three logic levels, the result vectors may be generated in parallel. More particularly, as shown in the RTL code segment the first-free result vector may be generated by performing logical AND operations between level 3 propagate signals and the pre-first vector, while the second-free result vector is generated by performing logical AND/OR operations between level 3 propagate signals and the pre-first vector and the pre-second vector. For example, bits [26:24] of the first-free result vector are generated by performing a bitwise logical AND operation between the triplet [7] prop2 signal of level 3 and each of bits [26:24] of the pre-first vector. Likewise, bits [26:24] of the second-free result vector are generated by performing a logical OR operation between the result of a bitwise logical AND operation between the triplet [7] prop2 signal of level 3 and each of bits [26:24] of the pre-second vector and a logical AND operation between the triplet [7] prop1 signal of level 3 and each of bits [26:24] of the pre-first vector.

It is noted that although the example above has been described in terms of the logical functions described in the RTL code segment, it is contemplated that once the RTL is synthesized by a logic synthesis tool the actual logic gate implementations may be different.

From the above description, the search units 201 and 203 may find the first two free register slots using less logic and with a smaller propagation delay that conventional logic that uses two wide AND-ing functions performed serially.

Figure 4:
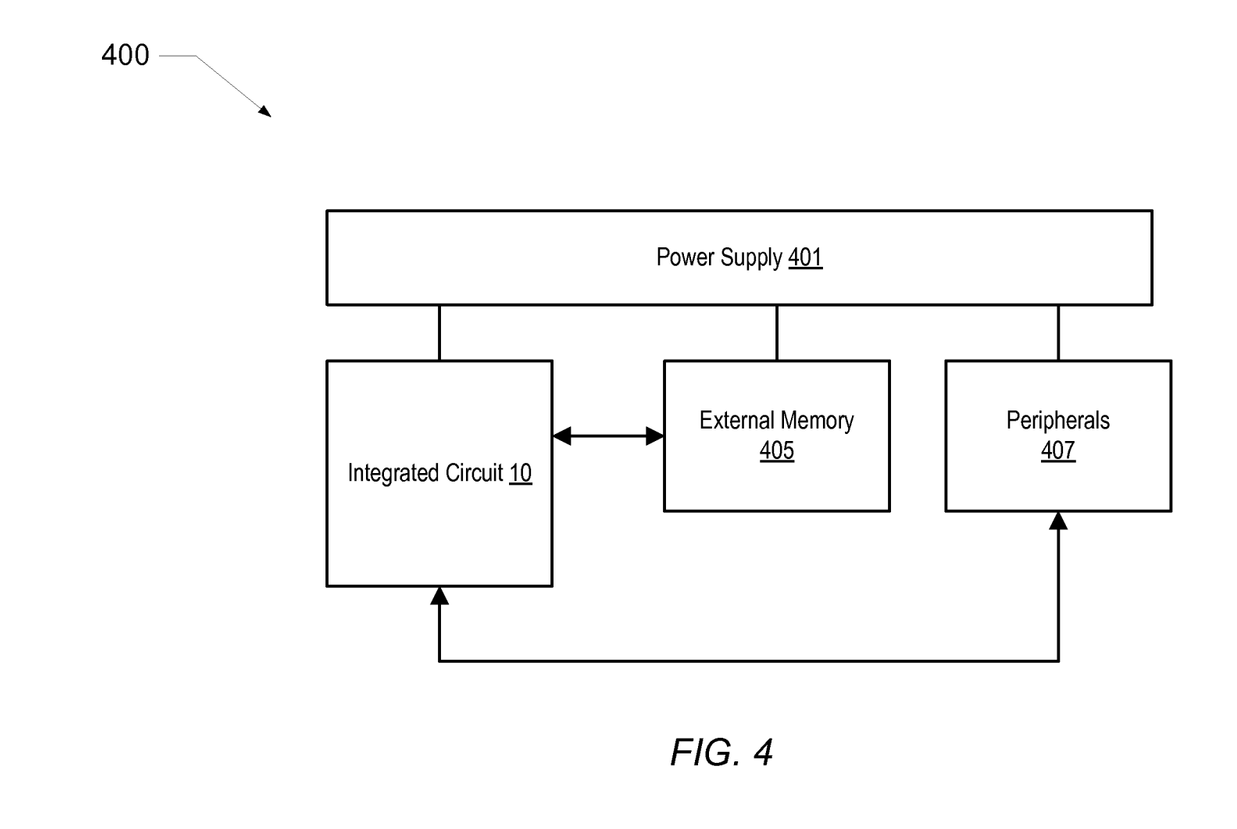
FIG. 4 is a block diagram of one embodiment of a system including the integrated circuit of FIG. 1.

Turning to FIG. 4, a block diagram of one embodiment of a system that includes the integrated circuit 10 is shown. The system 400 includes at least one instance of the integrated circuit 10 of FIG. 1 coupled to one or more peripherals 407 and a system memory 405. The system 400 also includes a power supply 401 that may provide one or more supply voltages to the integrated circuit 10 as well as one or more supply voltages to the memory 405 and/or the peripherals 407. In some embodiments, more than one instance of the integrated circuit 10 may be included.

The peripherals 407 may include any desired circuitry, depending on the type of system. For example, in one embodiment, the system 400 may be included in a mobile device (e.g., personal digital assistant (PDA), smart phone, etc.) and the peripherals 407 may include devices for various types of wireless communication, such as WiFi, Bluetooth, cellular, global positioning system, etc. The peripherals 407 may also include additional storage, including RAM storage, solid-state storage, or disk storage. The peripherals 407 may include user interface devices such as a display screen, including touch display screens or multitouch display screens, keyboard or other input devices, microphones, speakers, etc. In other embodiments, the system 400 may be included in any type of computing system (e.g. desktop personal computer, laptop, workstation, net top etc.).

The system memory 405 may include any type of memory. For example, the system memory 405 may be in the DRAM family such as synchronous DRAM (SDRAM), double data rate (DDR, DDR2, DDR3, etc.), or any low power version thereof. However, system memory 405 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   a search unit configured to access an input vector including a plurality of bits, and to find a first and a second instance of a predetermined bit value;
   wherein the search unit is further configured to:
   generate a first output vector that indicates a bit position of the first instance of the predetermined bit value within the input vector, wherein the bit position in the first output vector that corresponds to the first instance of the predetermined bit value is set to one logic value, and all other bit positions of the first output vector are set to a different logic value; and
   generate a second output vector that indicates a bit position of the second instance of the predetermined bit value within the input vector, wherein the bit position in the second output vector that corresponds to the second instance of the predetermined bit value is set to the one logic value, and all other bit positions of the second output vector are set to the different logic value.

2. The integrated circuit as recited in claim 1, wherein the search unit includes preliminary vector logic configured to create a preliminary first vector and preliminary second vector each including groups of bits, each group including a plurality of bits, wherein each bit within each group of bits corresponds to a respective bit position of the input vector.

3. The integrated circuit as recited in claim 2, wherein a given group of bits of the preliminary first vector is encoded to indicate whether the corresponding respective bit position within the input vector includes a first instance of the predetermined value within the given group.

4. The integrated circuit as recited in claim 3, wherein a given group of bits of the preliminary second vector is encoded to indicate whether the corresponding respective bit position within the input vector includes a second instance of the predetermined value within the given group.

5. The integrated circuit as recited in claim 2, wherein the search unit includes a first logic level configured to operate on the groups of bits of the input vector to create a propagation value for each group of bits of the input vector, wherein each propagation value indicates whether zero, one or two predetermined values are within a given group of bits.

6. The integrated circuit as recited in claim 5, wherein the search unit includes a second logic level configured to operate on combinations of the results of the level one propagation values to create a second level propagation value for each of the propagation values of the first logic level.

7. The integrated circuit as recited in claim 6, wherein the search unit includes a third logic level configured to operate on combinations of the results of the level two propagation values to create a third level propagation value for each of the propagation values of the second logic level.

8. The integrated circuit as recited in claim 7, wherein the search unit includes a first result vector logic level configured to operate on combinations of the results of the third level propagation values and bit values stored in bit positions within the preliminary first vector to generate the first output vector.

9. The integrated circuit as recited in claim 7, wherein the search unit includes a second result vector logic level configured to operate on combinations of the results of the third level propagation values and bit values stored in bit positions within the preliminary second vector to generate the second output vector.

10. A processor comprising:
    a register bank including a plurality of registers;
    a storage including a plurality of bits, each bit corresponding to a respective register of the plurality of registers, wherein each bit is configured to indicate that the corresponding respective register is available with a predetermined bit value;
    a search unit coupled to the register bank and configured to access the storage and to find a first and a second instance of the predetermined bit value;
    wherein the search unit is configured to generate a first output vector that includes an indication of the bit position in the storage of the first instance of the predetermined bit value, wherein the bit position in the first output vector that corresponds to the first instance of the predetermined bit value is set to one logic value, and all other bit positions of the first output vector are set to a different logic value; and
    wherein the search unit is configured to generate a second output vector that includes an indication of the bit position in the storage of the second instance of the predetermined bit value, wherein the bit position in the second output vector that corresponds to the second instance of the predetermined bit value is set to the one logic value, and all other bit positions of the second output vector are set to the different logic value.

11. The processor as recited in claim 10, wherein the search unit includes preliminary vector logic configured to create a preliminary first vector and preliminary second vector each including groups of bits, each group including a plurality of bits, wherein each bit within each group of bits corresponds to a respective bit position of the input vector.

12. The processor as recited in claim 11, wherein a given group of bits of the preliminary first vector is encoded to indicate whether the corresponding respective bit position within the input vector includes a first instance of the predetermined value within the given group.

13. The processor as recited in claim 12, wherein a given group of bits of the preliminary second vector is encoded to indicate whether the corresponding respective bit position within the input vector includes a second instance of the predetermined value within the given group.

14. An integrated circuit comprising:
    an input vector including a plurality of bits each having a bit position, and each bit indicating one of a first predetermined value or a second predetermined value;

a search unit configured to access the input vector and to find a first and a second instance of the first predetermined bit value;

wherein the search unit is further configured to:

generate a first output vector in which a bit position in the first output vector that corresponds to the first instance of the predetermined bit value is set to one logic value, and all other bit positions of the first output vector are set to a different logic value; and generate a second output vector in which a bit position in the second output vector that corresponds to the second instance of the predetermined bit value is set to the one logic value, and all other bit positions of the second output vector are set to the different logic value.

15. The integrated circuit as recited in claim 14, wherein the search unit includes preliminary vector logic configured to create a preliminary first vector and preliminary second vector each including groups of bits, each group including a plurality of bits, wherein each bit within each group of bits corresponds to a respective bit position of the input vector.

16. The integrated circuit as recited in claim 15, wherein the search unit includes a plurality of logic levels, wherein each logic level is configured to create propagation values beginning with the input vector and based on propagation values from a preceding logic level, wherein a propagation value indicates whether zero, one or two predetermined values are within a given group of bits.

17. The integrated circuit as recited in claim 16, wherein the search unit includes a first result vector logic level configured to operate on combinations of the propagation value results of a last logic level of the plurality of logic levels and bit values stored in bit positions within the preliminary first vector to generate the first output vector.

18. The integrated circuit as recited in claim 17, wherein the search unit includes a second result vector logic level configured to operate on combinations of the propagation value results of the last logic level plurality of logic levels and bit values stored in bit positions within the preliminary second vector to generate the second output vector.

19. The integrated circuit as recited in claim 18, wherein the second result vector logic level is configured to generate the second output vector concurrently while the first result vector logic level generates the first output vector.

20. An integrated circuit comprising:

a storage for storing an input vector including a plurality of bits each having a bit position, and each bit indicating one of a first predetermined value or a second predetermined value; and a search unit configured to access the input vector and to find a first and a second instance of the first predetermined bit value;

wherein the search unit is further configured to generate a first output vector and a second output vector to indicate a bit position of the first and the second instance of the first predetermined bit value, respectively;

wherein the respective bit position in the first output vector and the second output vector that correspond to the first instance and the second instance of the predetermined bit value, respectively, is set to one logic value, and all other bit positions of the first output vector and the second output vector are set to a different logic value.

21. The integrated circuit as recited in claim 20, wherein the search unit includes a plurality of logic levels, wherein each logic level is configured to create propagation values beginning with the input vector and based on propagation values from a preceding logic level, wherein a propagation value indicates whether zero, one or two predetermined values are within a given group of bits.

22. The integrated circuit as recited in claim 20, wherein the output includes a first result vector logic configured to generate a first output vector, and a second result vector logic configured to generate a second output vector, wherein the first output vector includes an indication of a bit position of the first instance of the predetermined bit value within the input vector, and the second output vector includes an indication of a bit position of the second instance of the predetermined bit value within the input vector.

* * * * *